US010906664B2

(12) United States Patent
Ljung (10) Patent No.: US 10,906,664 B2
(45) Date of Patent: Feb. 2, 2021

(54) MULTI-ROTOR AERIAL VEHICLE (71) Applicant: ACC Innovation AB, Åtvidaberg (SE)

(72) Inventor: Anders Ljung, Mönsterås (SE)

(73) Assignee: ACC INNOVATION AB, Åtvidaberg (SE)

(*) Notice: Subject to any disclaimer, the term of this patent is extended or adjusted under 35 U.S.C. 154(b) by 547 days.

(21) Appl. No.: 15/523,244

(22) PCT Filed: Oct. 28, 2015

(86) PCT No.: PCT/SE2015/051142
§ 371 (c)(1),
(2) Date: Apr. 28, 2017

(87) PCT Pub. No.: WO2016/068784
PCT Pub. Date: May 6, 2016

(65) Prior Publication Data
US 2018/0016022 A1 Jan. 18, 2018

(30) Foreign Application Priority Data
Oct. 30, 2014 (WO) ........... PCT/SE2014/051288

(51) Int. Cl.
B64D 35/04 (2006.01)
B64C 39/02 (2006.01)
(Continued)

(52) U.S. Cl.
CPC ........... B64D 35/04 (2013.01); A63H 27/12 (2013.01); B64C 39/024 (2013.01); B64D 37/00 (2013.01);
(Continued)

(58) Field of Classification Search
CPC .... B64D 35/04; B64D 37/00; B64C 2201/04; B64C 2201/06; B64C 2201/108; B64C 2201/148; B64C 2201/165
See application file for complete search history.

(56) References Cited
U.S. PATENT DOCUMENTS 2,514,822 A * 7/1950 Wolfe, Jr. ............... B64C 37/00
244/2
3,211,399 A * 10/1965 Eickmann ............... B64C 27/12
244/17.23
(Continued)

FOREIGN PATENT DOCUMENTS

CN 101003302 A 7/2007
DE 1456007 A1 3/1969
(Continued)

OTHER PUBLICATIONS

Taiwanese Search Report for Application No. 104135648, dated May 17, 2019, in 2 pages (English translation included).
(Continued)

Primary Examiner — Philip J Bonzell
(74) Attorney, Agent, or Firm — Knobbe, Martens, Olson, Bear LLP (57) ABSTRACT Multi-rotor aerial vehicle (1, 1', 1", 1''', 1'''', 1''''', 1'''''') comprising, at least a first, second and third rotor 10, 20, 30, each rotatable by a dedicated first second and third hydraulic motor 11, 21, 31, a power unit 2, at least a first, second and third hydraulic pump 12, 22, 32 dedicated to the respective first, second and third hydraulic motor 11, 21, 31, wherein each hydraulic pump 12, 22, 32 is arranged to provide pressurized fluid to each hydraulic motor 11, 21, 31 for powering the hydraulic motor 11, 21, 31 and thereby rotating the respective rotor 10, 20, 30, a control unit 6 for controlling the operation of the multi-rotor aerial vehicle (1, 1', 1", 1''', 1'''', 1''''', 1''''''), wherein the control of the multi-rotor
(Continued)

aerial vehicle (1, 1', 1'', 1''', 1'''', 1''''', 1'''''') is arranged to be performed by altering the flow of pressurized fluid distributed to each respective hydraulic motor 11, 21, 31, wherein, wherein the flow of pressurized fluid provided to each hydraulic motor 11, 21, 31 is individually controllable by means of at least one control valve 13, 23, 33 configured to control the flow of pressurized fluid from each hydraulic pump 12, 22, 32 to its dedicated hydraulic motor 11, 21, 31.

25 Claims, 8 Drawing Sheets (51) Int. Cl.
A63H 27/00 (2006.01)
B64D 37/00 (2006.01)
(52) U.S. Cl.
CPC .... B64C 2201/027 (2013.01); B64C 2201/04 (2013.01); B64C 2201/06 (2013.01); B64C 2201/108 (2013.01); B64C 2201/146 (2013.01); B64C 2201/148 (2013.01)

(56) References Cited

U.S. PATENT DOCUMENTS

| | | | | |
|---|---|---|---|---|
| 3,245,637 | A * | 4/1966 | Eickmann | B64C 27/12 244/2 |
| 3,253,806 | A * | 5/1966 | Eickmann | B64C 29/0025 244/17.23 |
| 3,253,807 | A * | 5/1966 | Eickmann | B64C 27/12 244/17.23 |
| 3,260,479 | A | 7/1966 | Eickmann | |
| 3,345,016 | A | 10/1967 | Eickmann | |
| 3,503,574 | A * | 3/1970 | Eickmann | B64C 39/022 244/17.17 |
| 3,614,029 | A * | 10/1971 | Eickmann | B64C 11/00 244/17.23 |
| 3,768,757 | A * | 10/1973 | Eickmann | B64C 27/12 244/17.23 |
| 3,823,898 | A * | 7/1974 | Eickmann | B64C 11/28 244/55 |
| 3,977,302 | A * | 8/1976 | Eickmann | F03C 1/0447 91/492 |
| 3,983,833 | A * | 10/1976 | Eickmann | B63B 1/246 440/5 |
| 4,086,768 | A * | 5/1978 | Eickmann | B60K 17/10 244/53 R |
| 4,136,522 | A * | 1/1979 | Eickmann | F16H 39/02 60/484 |
| 4,136,845 | A * | 1/1979 | Eickmann | B64C 11/28 244/12.4 |
| 4,171,784 | A | 10/1979 | Eickmann | |
| 4,173,321 | A | 11/1979 | Eickmann | |
| 4,230,198 | A * | 10/1980 | Eickmann | B62D 57/04 114/150 |
| 4,405,103 | A * | 9/1983 | Eickmann | B64C 11/28 244/17.11 |
| 4,488,692 | A * | 12/1984 | Eickmann | B64C 11/28 244/55 |
| 4,630,528 | A * | 12/1986 | Eicknnann | F04B 1/1071 91/491 |
| 4,703,906 | A * | 11/1987 | Eickmann | B64C 11/28 244/17.23 |
| 4,856,732 | A * | 8/1989 | Eickmann | B64C 27/20 244/2 |
| 4,925,131 | A * | 5/1990 | Eickmann | B64C 11/28 244/123.9 |
| 4,982,914 | A | 1/1991 | Eickmann | |
| 7,011,274 | B1 * | 3/2006 | Hardoin | B64D 35/00 244/12.4 |
| 2011/0180667 | A1 * | 7/2011 | O'Brien | B64C 39/022 244/135 R |

FOREIGN PATENT DOCUMENTS

| | | |
|---|---|---|
| EP | 2228301 A2 | 9/2010 |
| FR | 2651139 A2 | 3/1991 |
| GB | 1110165 A | 4/1968 |
| JP | 50-019198 A | 2/1975 |
| JP | 52-067200 A | 5/1977 |
| JP | 53-006435 B | 3/1978 |
| JP | 2007-130200 A | 5/2007 |
| JP | 2010-158350 A | 7/2010 |
| JP | 2013-531573 A | 8/2013 |
| WO | 2014/075609 A1 | 5/2014 |
| WO | WO-2019074859 A2 * | 4/2019 ............ B64D 27/02 |
| WO | WO-2019074860 A1 * | 4/2019 ........... B64C 39/024 |

OTHER PUBLICATIONS

Taiwanese Office Action dated May 17, 2019 in 4 pages.
Australian Examination Report No. 1 for Application No. 2015340042 dated Aug. 14, 2018 in 2 pages.
European Search Report dated Mar. 7, 2018 for Application No. 15854629.1 in 7 pages.
Japanese Office Action and Search Report for Application No. 421928, dated Oct. 2, 2019, in 14 pages. (English translation included).

* cited by examiner

MULTI-ROTOR AERIAL VEHICLE

CROSS-REFERENCE TO RELATED APPLICATIONS

This application is the U.S. National Phase under 35. U.S.C. § 371 of International Application PCT/SE2015/051142, filed Oct. 28, 2015, which claims priority to International Application PCT/SE2014/051288, filed Oct. 30, 2014. The disclosures of the above-described applications are hereby incorporated by reference in their entirety.

The present invention relates to a multi-rotor aerial vehicle according to the preamble of claim 1.

BACKGROUND

Multi-rotor aerial vehicles have been known for a long time. They have recently become very popular as control systems have developed for the most common of these vehicles, the quadrocopter. The quadrocopter as known uses four electric motors powered by a battery. The control of the electric motors is very accurate and thus the known quadrocopters shows very stable flight. They are commonly used as photographic platforms carrying a camera, or other uses where a stabile flying platform is desired.

Such a quadrocopter is known from the document, WO 2014/108459 A1 which discusses the energy efficiency, and using electric motors.

Another document U.S. Pat. No. 4,456,430 discusses rotor crafts in general and is directed allowing freewheeling of the rotors for safety reasons. The document discusses variable pitch propellers, which is not a concept for quadrocopters in general.

SUMMARY OF THE INVENTION

The known quadrocopter uses a battery as a power source. Unfortunately the power source is of limited endurance and even though well-functioning the usual quadrocopter can only perform a typical endurance of 15-20 minutes. If the battery capacity is increased the pay-load of the vehicle is reduced. For use during sport events there is a desire to increase the endurance considerably. However there is also a desire to carry even more payload than the known quadrocopters. For instance larger cameras are of interest to be used when desiring to photograph at a distance in particular in low light conditions. Larger payloads is also required when other uses of the concept is to be considered, where there is a need for carrying heavier equipment. Thus is a desire to provide a quadrocopter that provide a considerably longer endurance and also at the same time can carry more payload. This would in general be performed by increasing the motor power of the electrical motors and increase the battery capacity. Several attempts have been made to incorporate the advantages of combustion engines in quad rotor designs by simply placing one combustion engine in each propeller. This has proven unsuccessful due to the fact that throttle control of a combustion engine is usually sluggish and unresponsive, a quadrocopter requires very precise revolution per minute control of the rotors in order to function properly.

At least one of the problems of the prior art is solved by the present invention being a multi-rotor aerial vehicle comprising, at least a first, second and third rotor, each rotatable by a dedicated first second and third hydraulic motor, at least one power unit, at least a first, second and third hydraulic pump dedicated to the respective first, second and third hydraulic motor, wherein each hydraulic pump is arranged to provide pressurized fluid to each hydraulic motor for powering the hydraulic motor and thereby rotating the respective rotor, a control unit for controlling the operation of the multi-rotor aerial vehicle, wherein the control of the multi-rotor aerial vehicle is arranged to be performed by altering the flow of pressurized fluid distributed to each respective hydraulic motor, wherein the flow of pressurized fluid provided to each hydraulic motor is individually controllable by means of at least one control valve configured to control the flow of pressurized fluid from each hydraulic pump to its dedicated hydraulic motor.

The advantage of the above multi-rotor aerial vehicle is that it is possible to achieve a particularly well-functioning multi-rotor aerial vehicle. And further is that bleeding of pressure does generate a substantial amount less heat than restricting the pressure. By doing so the size of the fluid cooler can be reduced and the fluid volume can be reduced. And also the fluid cooler can be combined with an expansion vessel of the hydraulic circuit. The above vehicle is particularly simple to build and standard components with minor modifications can be used. And also by not using electric motors the endurance can be prolonged.

In a further development of the multi-rotor aerial vehicle according to the above, further comprised is a transmitter/receiver unit for receiving remote control commands of the multi-rotor aerial vehicle.

The advantage of this is that the multi-rotor aerial vehicle can be a UAV. The UAV can thus be controlled from a distance and thus be able to enter areas which can be dangerous for any manned vehicle.

In a further development of the multi-rotor aerial vehicle according to the above, the at least one power unit uses a combustible fuel.

The advantage of this is that combustible fuel has a larger energy density than alternative energy sources used in modern multi-rotor aerial vehicle, such as batteries.

In a further development of the multi-rotor aerial vehicle according the above, the fuel is provided to the power unit from a fuel supply that is comprised on the multi-rotor aerial vehicle.

The advantage of this is that the multi-rotor aerial vehicle can operate without any physical connection to the ground.

In a further development of the multi-rotor aerial vehicle according the above, the fuel used by the power unit is supplied from an external fuel supply, preferably the external supply is situated on the ground, and the fuel is supplied through a fuel line through pumping from the ground up.

The advantage of this is that the endurance can be extended considerably and also the payload can also be increased as no internal or a very small internal fuel supply is needed. And also there is no need with complex aerial refuelling vehicles if the external fuel supply is situated on the ground.

In a further development of the multi-rotor aerial vehicle according to the above the at least one power unit is a gas turbine.

The advantage of using a gas turbine is that they are very reliable. Another advantage is that it is possible to use a multitude of fuels. A gas turbine has a very high power to weight ratio, low vibrations low weight and the ability to run of heavy fuel.

In a further development of the multi-rotor aerial vehicle according to the above, further is provided with at least one gyro unit associated with the control unit, wherein the control unit by the input received from the at least one gyro unit is able to independently in a stable manner control the multi-rotor aerial vehicle.

The advantage of this is that the control of the multi-rotor aerial vehicle is considerably simplified. And further a less skilled person can operate the multi-rotor aerial vehicle, without any particular training.

In a further development of the multi-rotor aerial vehicle according to the above, each hydraulic pump has a feed line to each dedicated hydraulic motor, and that through control of a dedicated control valve on each feed line, the fluid flow to each hydraulic motor is controlled, wherein the control valve is associated with the control unit, each control valve being arranged to bleed off fluid flow from respective feed line.

The advantage of this is that the control is particularly simple as each of the valves can be independently controlled in a precise and exact manner. It is also favourable in terms of heat produced, compared to other control modes.

In a further development of the multi-rotor aerial vehicle according to the above, the multi-rotor aerial vehicle has four rotors and each rotor, is powered and controlled according to any of the described rotors, in any of the claims above.

The advantage of this is that it provides a very stable and easy to configure multi-rotor aerial vehicle.

In further development of the multi-rotor aerial vehicle of the above each hydraulic motor and each rotor are positioned on a separate arm.

This has de advantage that by adjusting the length of the arm different control of the multi-rotor aerial vehicle can be achieved, by altering the lever arm of the rotors downforce. It has also the advantage that there is an increased modularity of the multi-rotor aerial vehicle. The arms can be easily disconnectable. Thus the multi-rotor aerial vehicle can be disassembled for transport by removing the arms including rotors and hydraulic motors. Also it gives more possibility for easier maintenance as a damaged arm, rotor and hydraulic motor can easily be changed by replacement of the arm rotor hydraulic package.

In a further development of the multi-rotor aerial vehicle according the above, the rotors, are associated in pairs such that two or four of the rotors, have the same size and configuration.

The advantage of this is that a simple reuse of components when designing the multi-rotor aerial vehicle can be achieved.

In a further development of the multi-rotor aerial vehicle according to the above, the rotational direction of the respective rotor, is arranged such that it is possible to achieve a zero rotational movement of the multi-rotor aerial vehicle.

The advantage of this is that there is no need for any rotor that is not used for lift purposes. This is to the contrary of for example a helicopter.

In a further development of the multi-rotor aerial vehicle according to the above, the rotational axis of the respective rotor, and hydraulic motor, is coaxial.

The advantage of this is that there mechanical construction of the multi-rotor aerial vehicle is very simple compared for example with a traditional helicopter, needing a complex swash plate in order to operate. There is an advantage of this that the construction also is easier to maintain. There is also an advantage of this that the rotors used can be of a standard configuration and need not any particular advantages. And a further advantage is that the weight of the multi-rotor aerial vehicle can be made lover, compared to a more complex system.

In a further embodiment of the multi-rotor aerial vehicle according the above, at least one of the rotors, is tiltable.

This is a particular advantage if increased speed in a particular direction of the multi-rotor aerial vehicle is a desire.

In a further development of the multi-rotor aerial vehicle according to the above, it comprises a self-sealable fuel tank.

The advantage of this is that if the fuel tank is damage by an external object the fuel will not leak to an extensive amount, and also the fire hazard is considerably reduced.

In a further embodiment of the multi-rotor aerial vehicle according to the above, further comprised are fixed wings for adding lift when the multi-rotor aerial vehicle, is moving forward in a fluid medium.

The advantage of this is that the multi-rotor aerial vehicle will be able to operate with a very increased endurance and also an increased range.

In a further development of the multi-rotor aerial vehicle according to the above, all of said at least three hydraulic pumps receive the same rotational input.

The advantage of this being that all the hydraulic pumps receives exactly the same amount of rotational input from the power unit. This makes the control of the fluid flow to each hydraulic motor particularly easy as flow output of hydraulic fluid from each hydraulic pump will be the same, at all moments.

In a further development of multi-rotor aerial vehicle according the above, the power unit transfers the power to the respective hydraulic pump through a gear, preferably such that each hydraulic pump receives the same rotational input.

The advantage of using a gear is that the rotational output from the power unit can be altered such that it is in line whit the desired rotational input for the hydraulic pumps. This will in turn lead to a more efficient multi-rotor aerial vehicle. The gear will mean that extra load will have to be carried.

According to a further development of the multi-rotor aerial vehicle of the above, the hydraulic pumps are arranged on a single output shaft of the power unit.

This is a particularly easy way of providing exactly the same rotational output to each hydraulic pump. This mechanical control of the synchronisation of the hydraulic pumps is particularly lightweight and provides for a fail safe control of the synchronisation of the hydraulic pumps.

According to a further development of the multi-rotor aerial vehicle according to the above, the multi-rotor aerial vehicle has at least five rotors, and each rotor is powered and controlled according to any of the described rotors in any of the above.

Providing more rotors provides for a stabile flight and should one rotor, or hydraulic motor fail it is still possible to operate the multi-rotor aerial vehicle. The number should not be construed as limited for five, six and more rotors give even further possibilities for controlling flight.

According to a further development of the multi-rotor aerial vehicle according to the above, wherein it comprises one dedicated power unit for each hydraulic pump, and wherein the dedicated power units are synchronized by the control unit such that each hydraulic pump receives the same rotational input.

This is an alternative development which will make the multi-rotor aerial vehicle heavier. By using smaller power units and synchronising the by the control unit, there is further possibilities for adaptation, regarding lift, and unbalances of the multi-rotor aerial vehicle.

According to a further development of the multi-rotor aerial vehicle according to the above, wherein the rotors have fixed pitch.

The advantage of this is that the rotor is particularly simple. The rotor can also be very cost effective to manufacture. And the rotor is very robust.

According to a further development of the multi-rotor aerial vehicle according to the above where applicable, wherein the rotors have a pitch that is adjustable manually when the multi-rotor aerial vehicle is not in operation.

The advantage of this is that the rotors can be adjusted for reasons comprising the operational conditions. That could be different humidity of air, temperature of air, or height of operation.

According to a further development of the multi-rotor aerial vehicle according to the above, wherein the rotors have a pitch that is adjustable in flight.

The advantage of this is that the adjustment of the pitch can be made very quickly.

DETAILED DESCRIPTION

According to this patent application the following definitions are used:

Multi-rotor aerial vehicle: An aerial vehicle that can take off and land vertically having no need for a specific rotational movement preventing rotor. Further the multi-rotor aerial vehicle does not comprise a helicopter swash plate on the rotor axis. Thus the rotors should not be able to alter the rotor plane with regard to the rotational axis of the motor driving the rotor. This means that the rotors are generally comparable to a propeller of a normal aeroplane. Thus in essential multi-rotor aerial vehicle according to the present invention should be able to hover, land and take off vertically.

The number of rotors is not limited to the disclosed embodiments below. It should be understood that the number of rotors can be from three to any desired number, most preferred is four rotors.

Rotor in the context of the present comprises propellers, rotors of different blade configuration, and also fan-like rotors.

Fixed pitch rotor: The rotor cannot alter the pitch of the respective rotor wing, i.e. rotor blade. This means that no rotation of the rotor wing/blade can be performed in its longitudinal axis. For all embodiments below fixed pitch rotors are preferred.

Manually adjustable rotor pitch: This means that the rotor wing/blade angle can be adjusted on ground when the multi-rotor aerial vehicle is not in operation. In essence this means that the pitch actually is fixed when the vehicle is ready for operation, but that the angle of the respective rotor wing/blade can be adjusted before operation.

Rotor pitch adjustable in flight: This means that the pitch of the respective rotor wing/blade can be adjusted in flight by adjustment of the pitch angle. Even though this is not a preferred way of operating the multi-rotor aerial vehicle, it is still possible.

Fuel supply: Supply of fuel is in general meaning a container for liquid fuel, however it should be understood that it is possible for it to be a gas container, a powerful battery, or any other suitable power source, such as a fuel cell with an appropriate substance to be decomposed for producing electricity.

Power unit: The power unit is in general a power unit operating by combustion of a combustible fuel. In general it is a gas turbine, but could likewise be an Otto motor, a diesel motor, an electric motor or any other suitable motor.

Fuel line: In general it is meant a pipe that can deliver liquid fuel to a power unit. However if the power unit is an electric motor the fuel line should be construed as being an electric cable.

Control unit: The control unit is in general a programmable computer unit, also known as a CPU, comprising a processor, memory circuits and all other common features associated with a control unit in general. All embodiments have a control unit.

For all embodiments below there is a main body.

For all described embodiments, details, elements or other features being alike are denominated with the same reference numbers.

Figure 1:
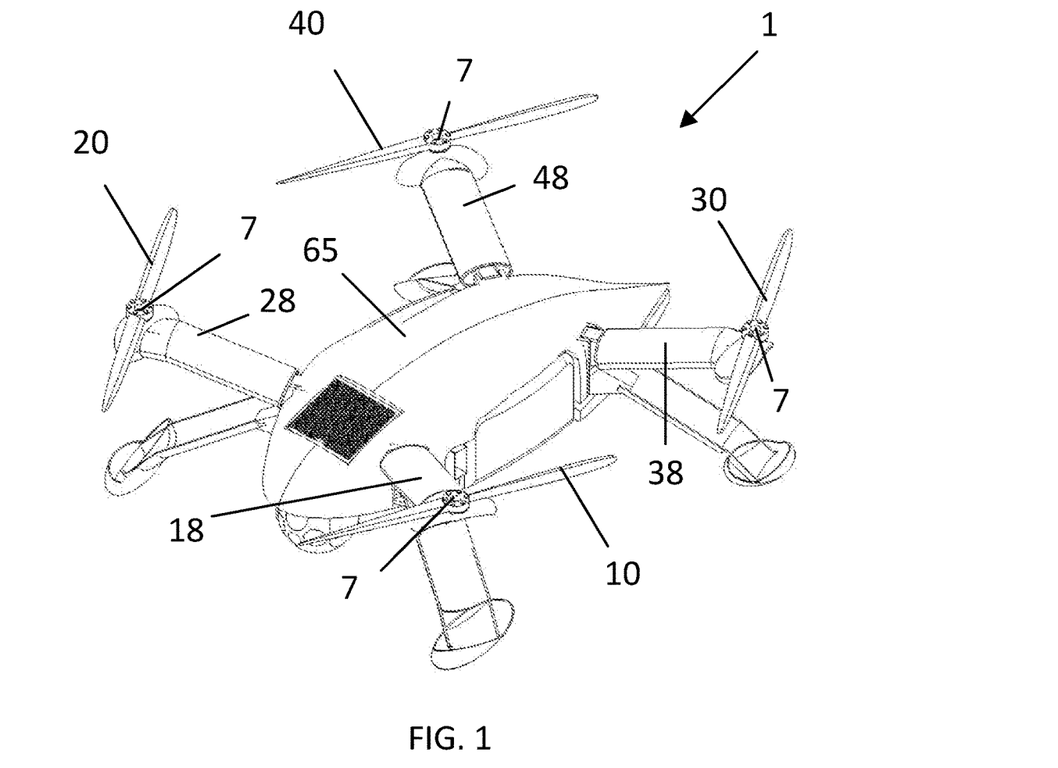
FIG. 1 discloses an embodiment of a multi-rotor aerial vehicle according to the invention.
Figure 4:
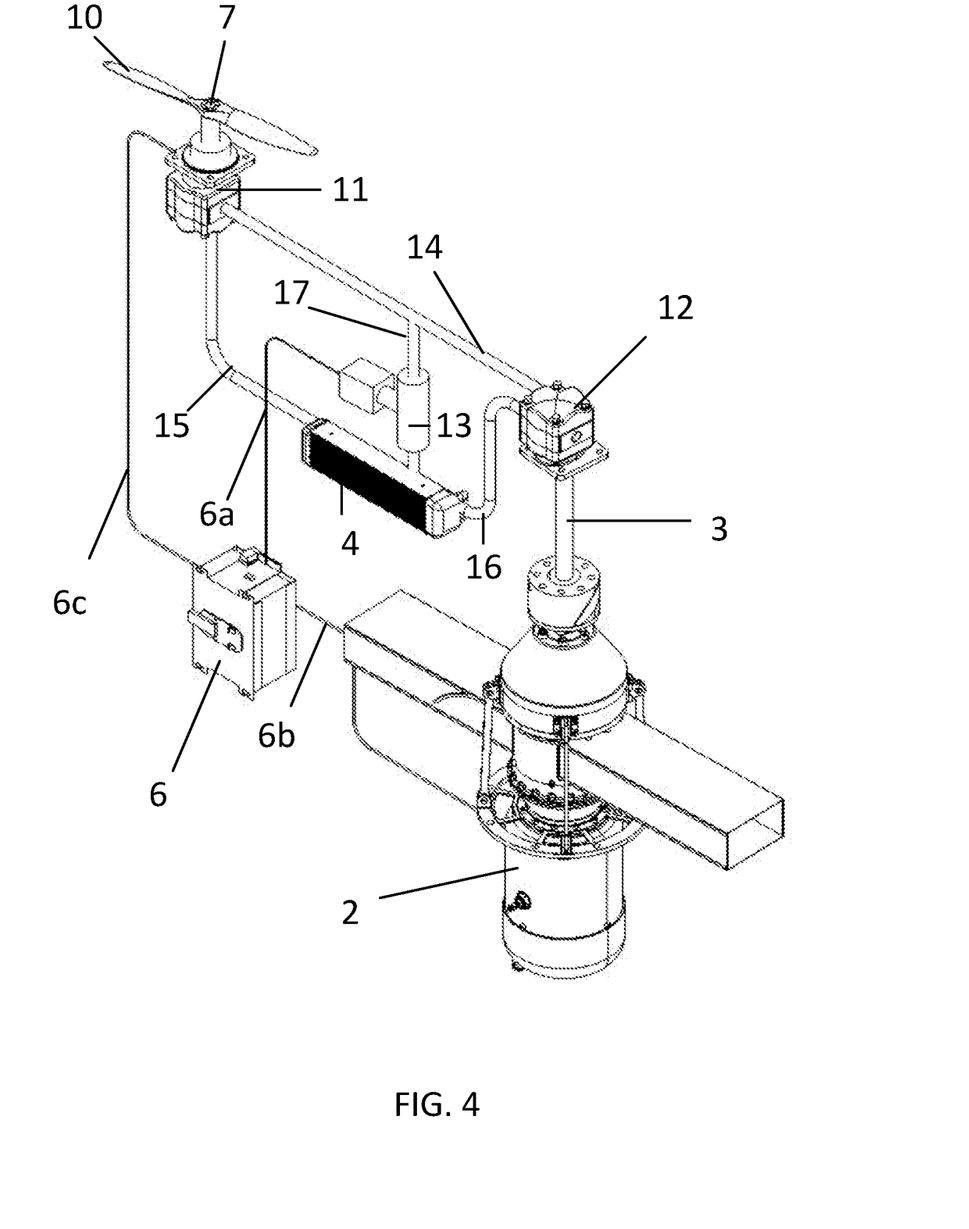
FIG. 4 disclose in detail the design of a section of the multi-rotor aerial vehicle according to the invention.

A first embodiment is disclosed in FIG. 1 where a multi-rotor aerial vehicle 1 in the form of a quadrocopter is described. The multi-rotor aerial vehicle 1 has a main body 65. Each of the rotors 10, 20, 30, 40 of the multi-rotor aerial vehicle 1 is powered according to FIG. 4. There a power unit 2 is disclosed. The power unit 2 is preferably a gas turbine but could also be any rotational motor according to the above. From the power unit 2 a rotatable shaft 3 is extending. On this shaft 3 there is positioned a hydraulic pump 12. The pump has a rotational element inside that is movable by means of the shaft 3. From the hydraulic pump 12 a fluid line 14 provides pressurized fluid to a hydraulic motor 11. The hydraulic motor 11 has a rotatable axis 7 in form of a shaft on which a rotor 10 is mounted. On the fluid line 14 there is provided a bleed line 17 that has a control valve 13 mounted there on. Bleed line 17 is arranged to by means of the control valve 13 be able to bleed of fluid flow to an expansion vessel 4. The control valve 13 is controlled by a control unit 6 by means of a control line 6a. Thus by adjusting the control valve 13 the flow of fluid to the hydraulic motor 11 can be controlled. By doing this the rotational velocity and power to the rotor 10 can be controlled in a precise manner. The control of the revolutions per minute of the propeller 10 is performed by the control unit 6 through a control line 6c. This is also termed the hydrostatic drive of the multi-rotor aerial vehicle, and the revolutions per minute of the respective rotor 10 is controlled by bleeding of fluid, such as hydraulic oil, from the pressure line 14 to the return line 16 by using a precision control valve 13 which is governed by the flight control system. A resolver, not shown, provides information of the rotor blades position as well as rotor revolutions per minute through control line 6c. The advantage of this as opposed to mounting a pressure regulator on the pressure side is that bleeding of pressure does generate a substantial amount less heat than restricting the pressure. As doing so the need of fluid cooler and fluid volume is reduced and the fluid cooler can be combined with the expansion vessel 4 of the hydraulic circuit. Only the function of one rotor 10 is presented in FIG. 4 as all rotors are identical when it comes to power transmission. Each rotor is positioned on separate arms 18, 28, 38, 48. The arms 18, 28, 38, 48 extend from the main body 65. This has de advantage that by adjusting the length of the arm different control of the multi-rotor aerial vehicle can be achieved, by altering the lever arm of the rotors downforce. It has also the advantage that there is an increased modularity of the multi-rotor aerial vehicle. The arms can be easily disconnectable. Thus the multi-rotor aerial vehicle can be disassembled for transport by removing the arms including rotors and hydraulic motors. Also it gives more possibility for easier maintenance as a damaged arm, rotor and hydraulic motor can easily be changed by replacement of the arm rotor-hydraulic-package. As can be seen in FIG. 1 the rotational axis 7 for the rotors 10, 20, 30, 40 is the same as the rotational axis of the respective hydraulic motors 11, 21, 31, 41. The described multi-rotor aerial vehicles according to FIGS. 8, 9, 10, can also be comprise as discussed above four rotors, hydraulic motors, and hydraulic pumps etc.

Figure 2:
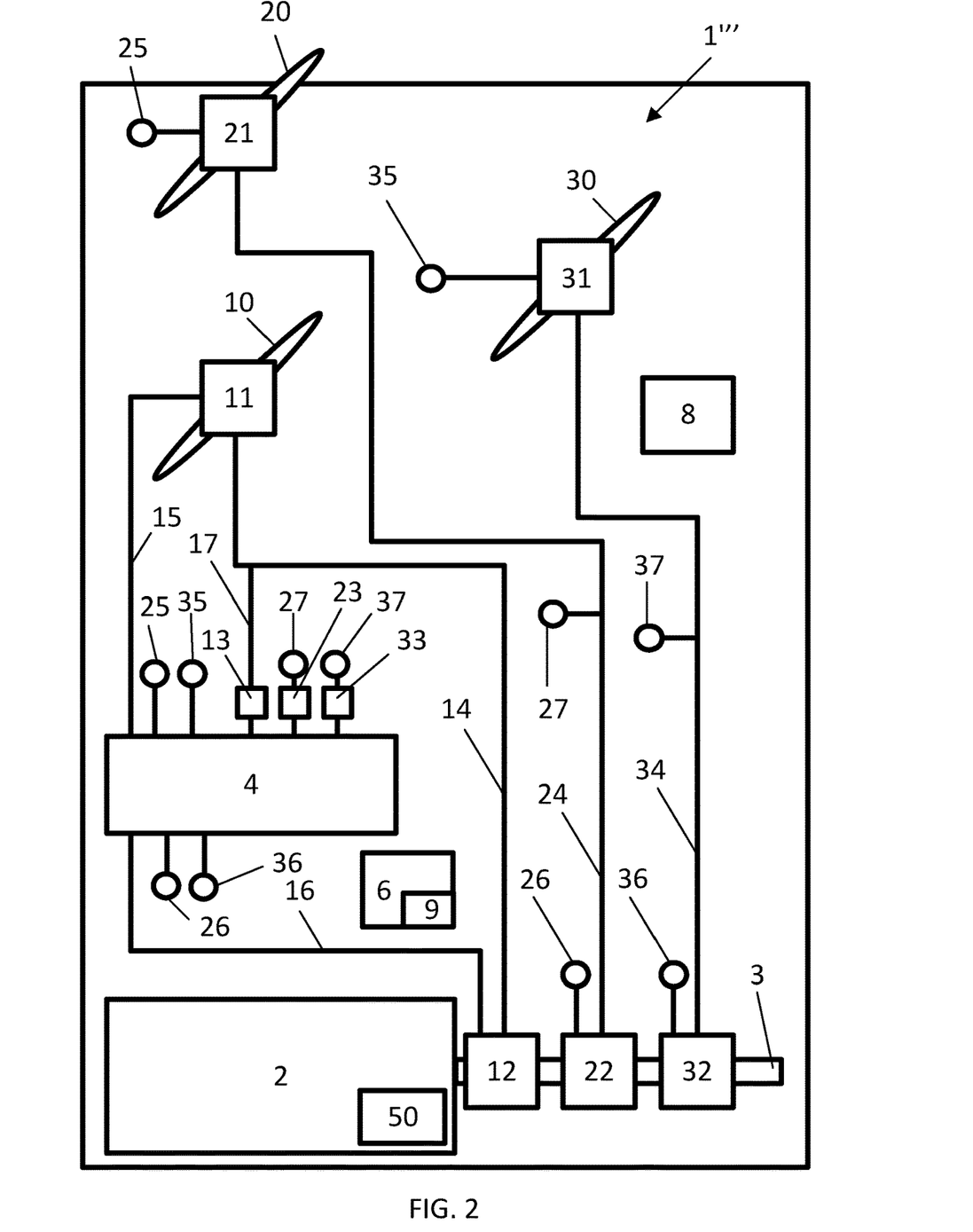
FIG. 2 discloses an embodiment of a multi-rotor aerial vehicle according to the invention with three rotors.

According to FIG. 2, there is described a multi-rotor aerial vehicle 1''' that has three rotors 10, 20, 30. And consequently three hydraulic pumps 12, 22, 32 and three hydraulic motors 11, 21, 31. The multi-rotor aerial vehicle 1''' also has a control unit 6. There is also provided a transmitter-emitter unit 8. And a fuel supply 50. The main features of FIG. 4 should be understood to be present for this embodiment too. All hydraulic motors 12, 22, 32 are mounted on the same shaft 3. Thus all hydraulic motors 12, 22, 32 receive the same mechanical transmission from the shaft 3. Also disclosed is a cooler combined with a vessel 4 for receiving the return fluid from the motor and/or the bleed lines, 17, 27, 37 of the feed lines, 14, 24, 34. From the vessel 4 all the hydraulic motors 12, 22, 32 have feed lines of hydraulic fluid 16, 26, 36 that provides fluid for pressurising in the respective motors 12, 22, 32. From each motor 11, 21, 31 a line of fluid 15, 25, 35, is returned to the combined cooler and vessel 4. Preferably there is included a gyro unit 9 for adding control information to the control unit 6. In a preferred embodiment the gyro unit 9 is included within the control unit 6. The gyro unit 9 can also be a separate unit positioned on the multi-rotor aerial vehicle 1. The gyro unit 9 should preferably by able to sense both yaw and pitch movements of the multi-rotor aerial vehicle.

Figure 3:
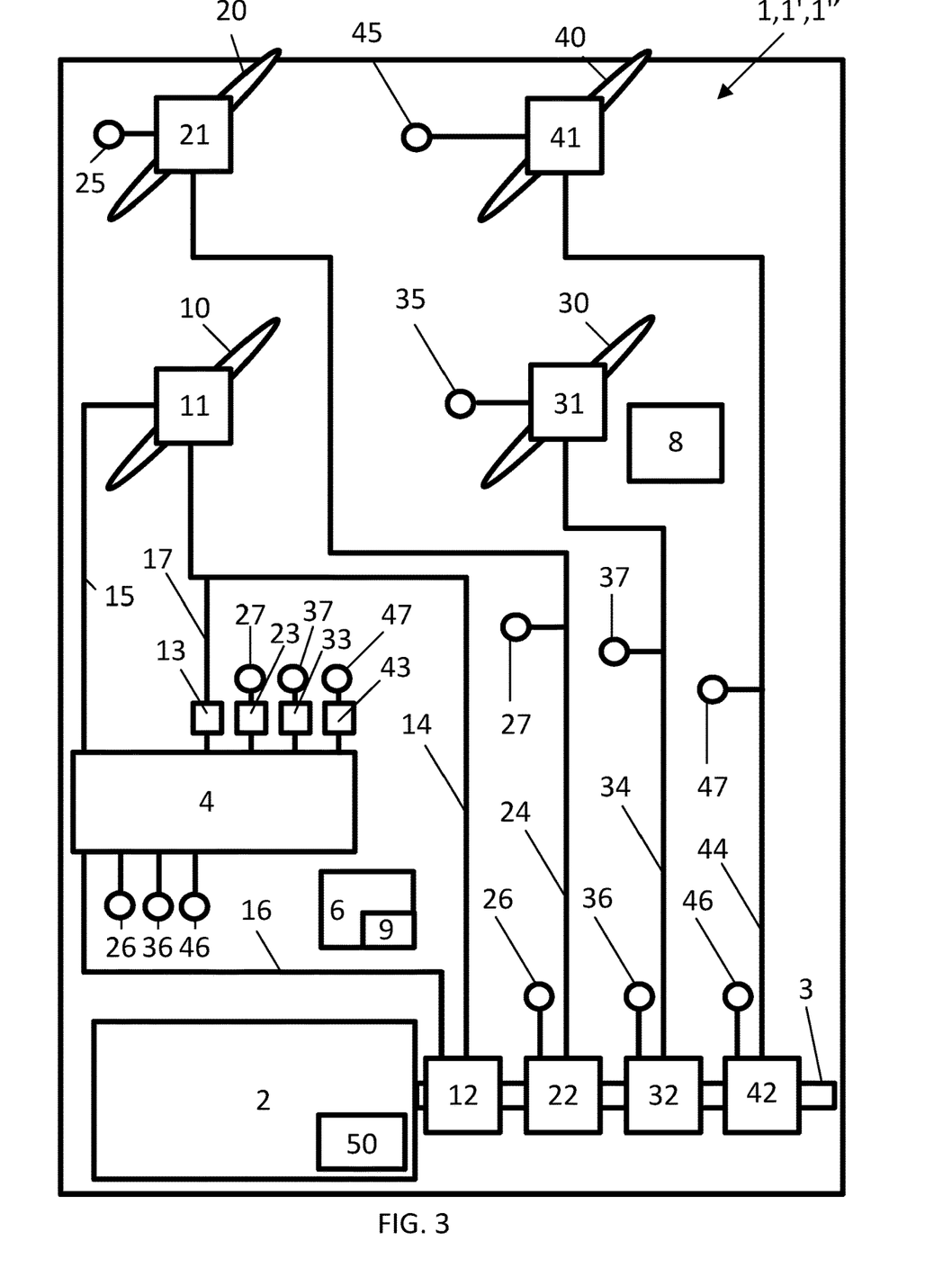
FIG. 3 discloses an embodiment of a multi-rotor aerial vehicle according to the invention with four rotors.
Figure 5:
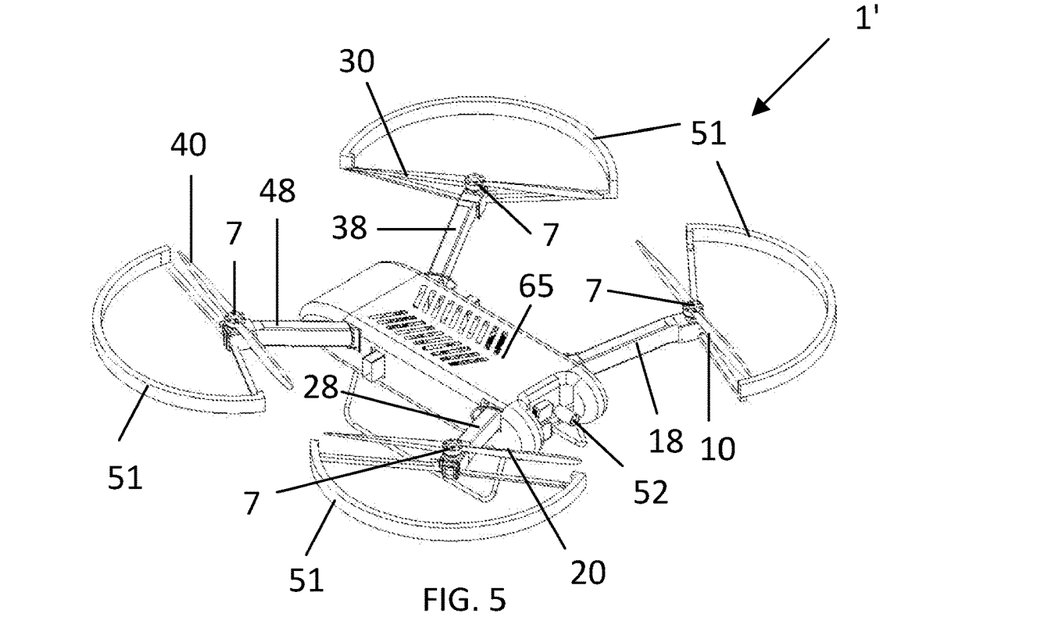
FIG. 5 discloses an embodiment of the present invention with no or very small internal fuel supply.

According to FIG. 3 there is describe a multi-rotor aerial vehicle 1 having four rotors, such as the one of FIG. 1 and FIG. 5. All other things are common with the embodiment of FIG. 2 and FIG. 4, such as power unit 2, control unit 6 gyro unit 9 etc. The rotors 10, 20, 30, 40 of this vehicle rotate in two different directions where rotor 10 and 40 rotates in the same direction. And rotor 20 and 30 rotates in the same direction. This prevents from the multi-rotor aerial vehicle 1 from rotating when same power output is transferred to each rotor 10, 20, 30, 40. It should be understood that if the same hydraulic motors 11, 21, 31, 41 is applied and all rotors 10, 20, 30, 40 are the same, the power output transferred is equal to the flow of pressurized fluid to each hydraulic motor 11, 21, 31, 41.

According to FIG. 5 there is disclosed an embodiment 1' of the present invention. The same configuration as described in relation of FIG. 3 and FIG. 4, or FIGS. 8, 9 and 10, is applicable. The multi-rotor aerial vehicle 1' has a main body 65. However there is a major difference. This embodiment 1' is arranged to be able to have a main fuel supply 60 that is not situated on the multi-rotor aerial vehicle 1' itself. Instead an external fuel supply is provided. However according to FIG. 4 it can have a smaller fuel supply 50 on the multi-rotor aerial vehicle 1' for buffering of fuel or if the external fuel supply is cut, the small internal fuel supply can be used for emergency operation and landing. The internal fuel supply typically gives an endurance of 5-15 minutes typically essentially 10 minutes of endurance. The embodiment 1' of FIG. 5 can be equipped for rescuing operation or firefighting. One example of operation can be seen in FIG. 7. The fuel are either pumped through a pipe 59 or if being electrical provided through a power line. The position of the external fuel supply 60 can be on the ground. The position of the external fuel supply can be on another aerial vehicle that can operate alongside the multi-rotor aerial vehicle 1' and perform aerial refuelling or recharging. The endurance of this embodiment is extensive and virtually unlimited. As the fuel supply 50 on the multi-rotor aerial vehicle 1' can have a very reduced size and capacity, i.e. a much lower weight than for previous embodiments, the pay-load for the multi-rotor aerial vehicle 1' can be increased by the corresponding weight. For this embodiment it is also possible to use a wire controlled transmitter-emitter 8 unit. Wherein control commands to this vehicle is transmitted of the wire. It is a particular advantage as the wire can be protected from external disturbances and thus the safety of the multi-rotor aerial vehicle 1' is improved. One further feature that can be added to the multi-rotor aerial vehicle 1' of FIG. 5, but also equally to any of the embodiments of FIGS. 1, 2, 3 and 6, are protective shields, 51. These shields 51 ads weight but can be of particular advantage when operating close to external objects such as a building 61. In FIG. 5 is also drawn an optional water canon 52. The water cannon 52 is essentially a nozzle for providing for example water, foam or any other fire extinguishing liquid, to a fire. The fire extinguishing liquid is preferably not carried on the multi-rotor aerial vehicle 1' but supplied through a line to the multi-rotor aerial vehicle 1' as it operates. It should also be understood that the embodiment of FIG. 5 could instead have a hoist system for example for rescuing operations. And further this embodiment also has the rotors 10, 20, 30, 40 and the hydraulic motors 11, 21, 31, 41 positioned on separate arms 18, 28, 38, 48 as can be seen in FIG. 5. This configuration gives the already mentioned advantages described with the embodiment according to FIG. 1. As can be seen in FIG. 5 the rotational axis 7 for the rotors 10, 20, 30, 40 is the same as the rotational axis of the respective hydraulic motors 11, 21, 31, 41. Hoist, water canon 52 can of course be applied to any embodiment.

Figure 6:
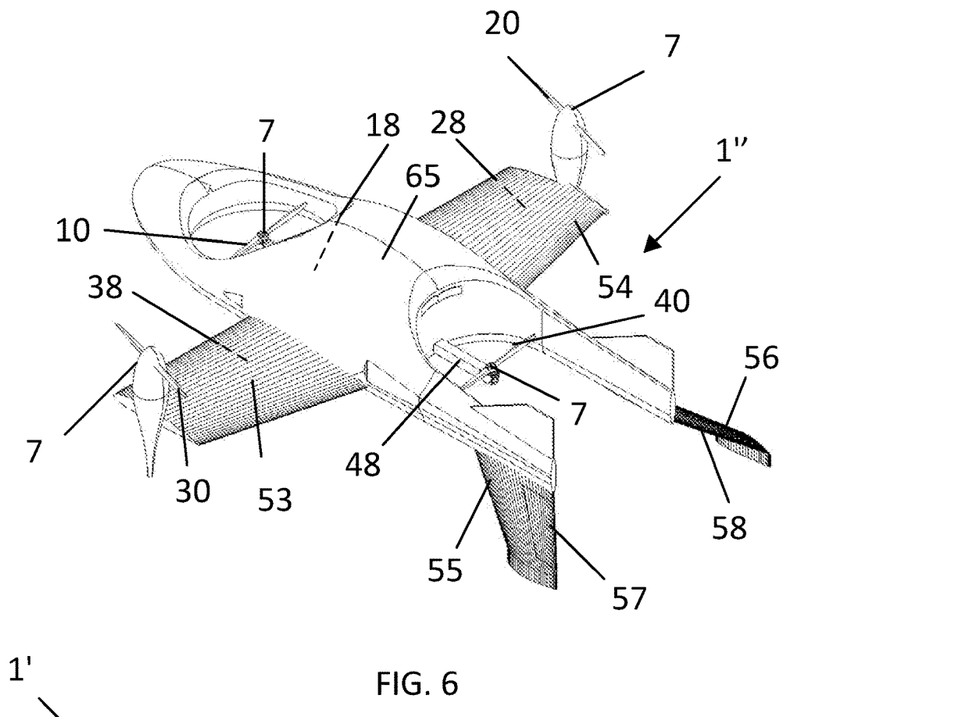
FIG. 6 discloses an embodiment of the present invention with in addition to rotors also being provided with fixed wings in order to provide lift at forward flight.
Figure 7:
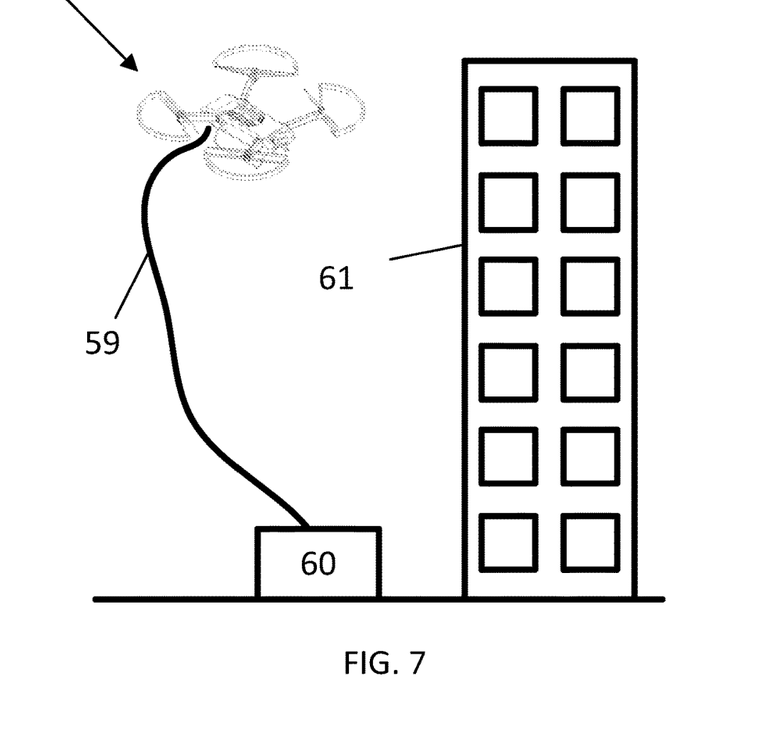
FIG. 7 discloses the embodiment of FIG. 5 in operation.

In FIG. 6 a third embodiment 1'' of the present invention is disclosed. As for the previous embodiments all features of FIGS. 1, 2, 3 and 4, or FIGS. 8, 9 and 10, discussed in connection with these figures applies. There is a main body 65. There are two mayor differences compared to previous embodiments. The multi-rotor aerial vehicle 1 is provided with fixed wings 53, 54. And also there is provide fins 55, 56 and rudders 57, 58. One further feature of this multi-rotor aerial vehicle 1" is that two of the rotors 20, 30 are tiltable in two essentially parallel planes. The common planes are essentially extending from the wing tips perpendicularly to the extension of the wings and parallel with the longitudinal axis of the multi-rotor aerial vehicle 1". By tilting the rotors 20 and 30 the multi-rotor aerial vehicle can essentially transform into a forward moving fixed wing aerial vehicle. Also the respective hydraulic motor 21 and 31 will tilt together with the rotors 20, 30. The range will be extended considerably compared to other embodiments. The fuel consumption when in this mode will also be considerably reduced. Both rotor 10 and rotor 40 can essentially be stopped when using wings 53, 54 for providing the main lift of the vehicle. As the multi-rotor aerial vehicle 1" transition into hovering both the forward rotor 10 and the aft rotor 40 are given more given more and more power through their respective hydraulic motors 11 and 41, until full hovering is reached. This is as for all embodiments controlled through the control unit 6. And further this embodiment preferably also have the rotors 10, 20, 30, 40 and the hydraulic motors 11, 21, 31, 41 positioned on separate arms 18, 28, 38, 48 as can be seen in FIG. 6. This configuration gives the already mentioned advantages described with the embodiment according to FIGS. 1, 2, 3 and 4. However in order to increase the modularity of this embodiment also the wings 53, 54 can be made removable from the multi-rotor aerial vehicle 1" of FIG. 6 for increased possibility of transportation. In general the forward positioned rotor 10, and hydraulic motor 11 could be arranged to not be positioned on an arm but instead to be suspended in the multi-rotor aerial vehicle 1" body 65, in particular if a self-supporting main body 65 is used. As can be seen in FIG. 7 the rotational axis 7 for the rotors 10, 20, 30, 40 is the same as the rotational axis of the respective hydraulic motors 11, 21, 31, 41.

Figure 8:
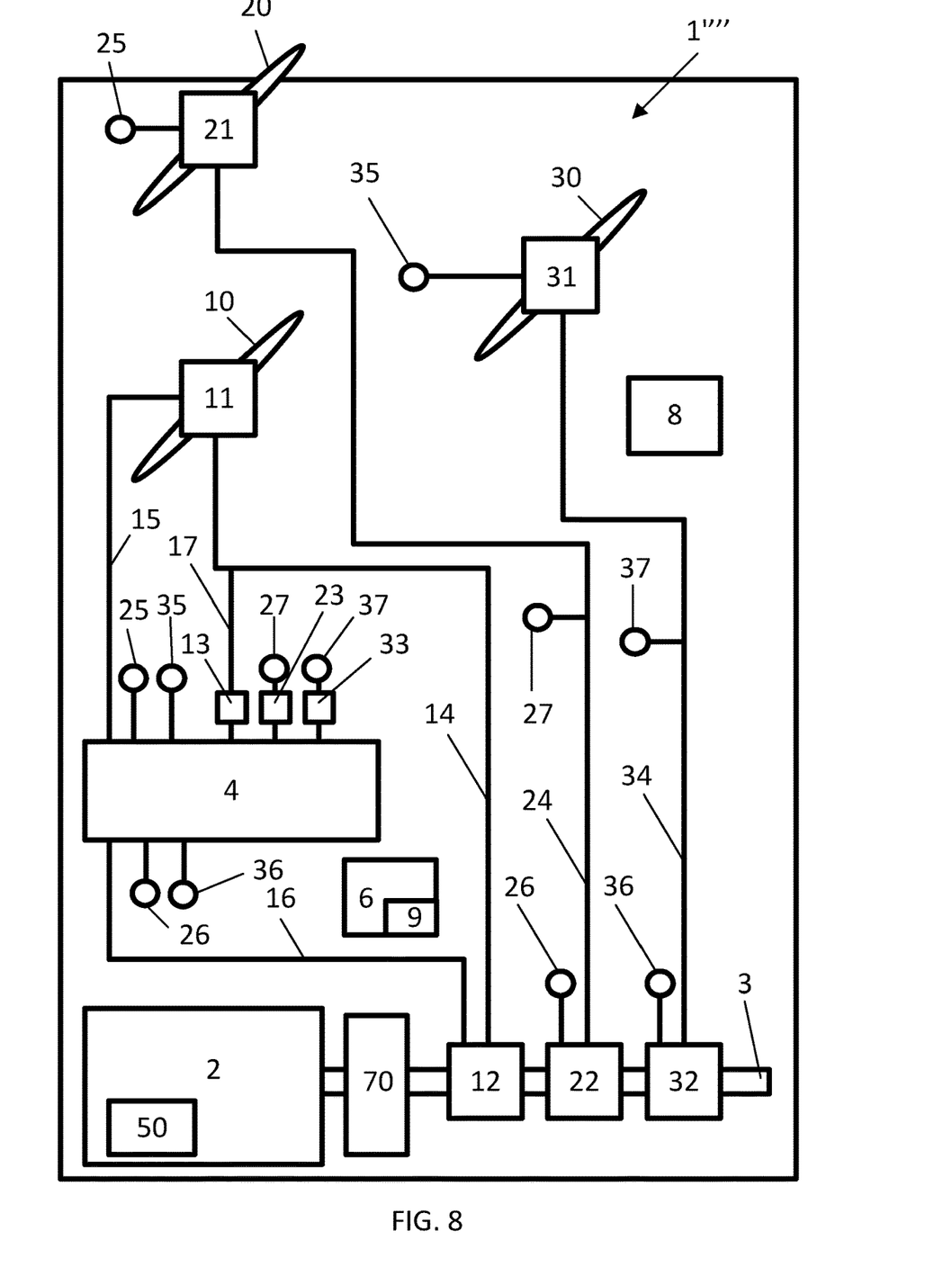
FIG. 8 discloses an embodiment of a multi-rotor aerial vehicle according to the invention with a gear provided before the hydraulic pumps.
Figure 9:
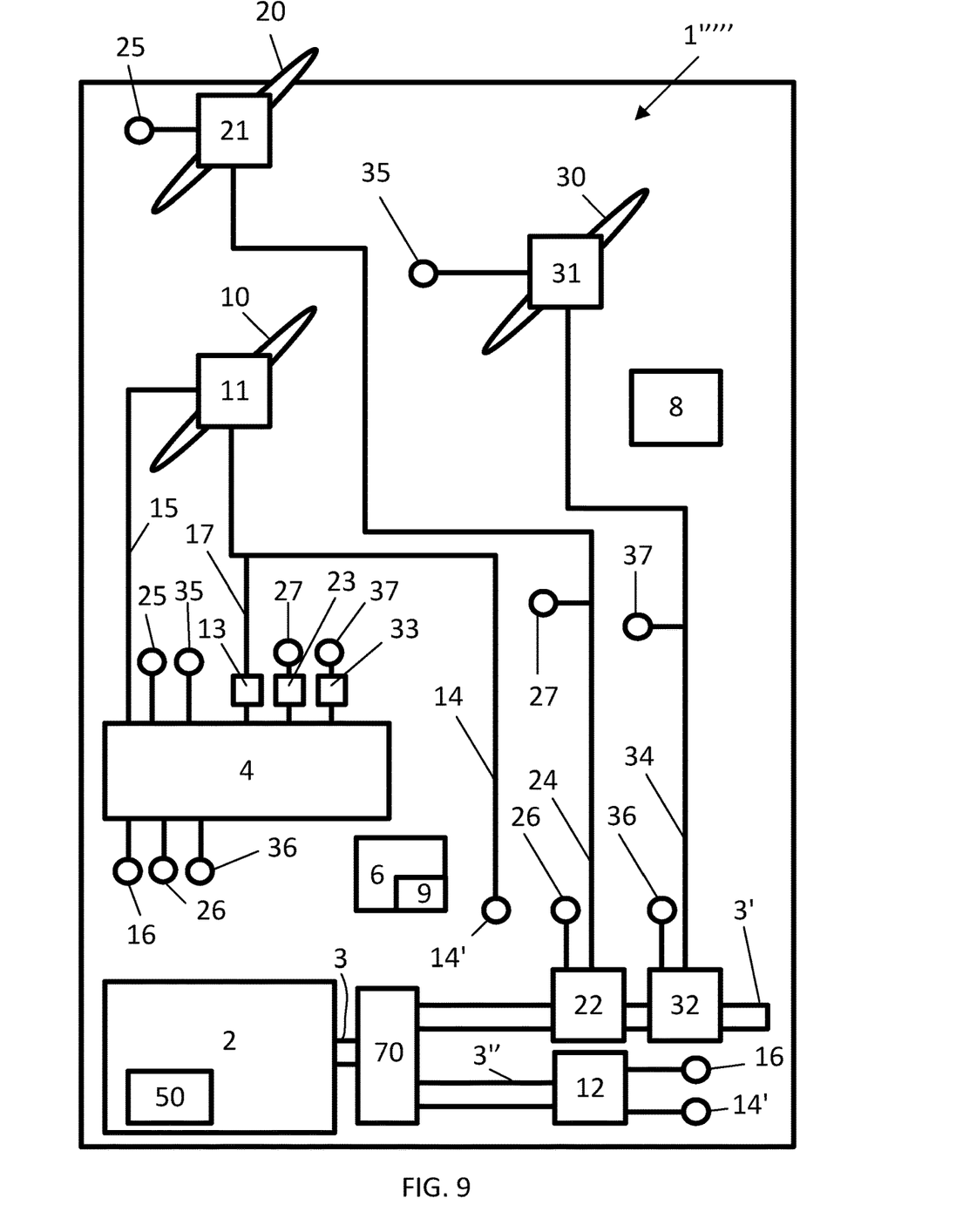
FIG. 9 discloses an embodiment of a multi-rotor aerial vehicle according to the invention comprising a gear provided before the hydraulic pumps.

According to FIGS. 8 and 9, multi-rotor aerial vehicle 1'''', 1''''' there can be a gear 70 between the output shaft of the power unit 2 and the hydraulic pumps 12, 22, 32. The gear 70 can alter the revolutions per minute from the shaft of the power unit 2 such that it is suitable for the operation of the hydraulic pumps, 12, 22, 32. For most applications the revolution per minute of the power unit output is reduced by means of the gear 70. But it is of course thinkable to increase the number of revolutions per time unit if so is desired, by means of the gear 70, if so is desired. By using a particular gear, as seen in FIG. 8, the pumps 12, 22, 32, can be arranged on different rotating shafts, 3', 3". It is however preferable that the pumps 12, 22, 32 always receive the same rotational output. For all other aspects of the disclosure other features of FIG. 8 and FIG. 9, the features are the same. Also it should be understood that the numbers of rotors, hydraulic pumps and hydraulic motors etc. can be chosen at any number. FIG. 9 has an altered disclosure with regard to the pressurized hydraulic fluid line 14' and hydraulic feed line 16, this is only made for simplification of the Figure. The gear 70 is of course applicable to all embodiments described, and as in FIGS. 1-7. In configuration of FIG. 10, a gear for each power unit 2a, 2b, 2c is applicable.

Figure 10:
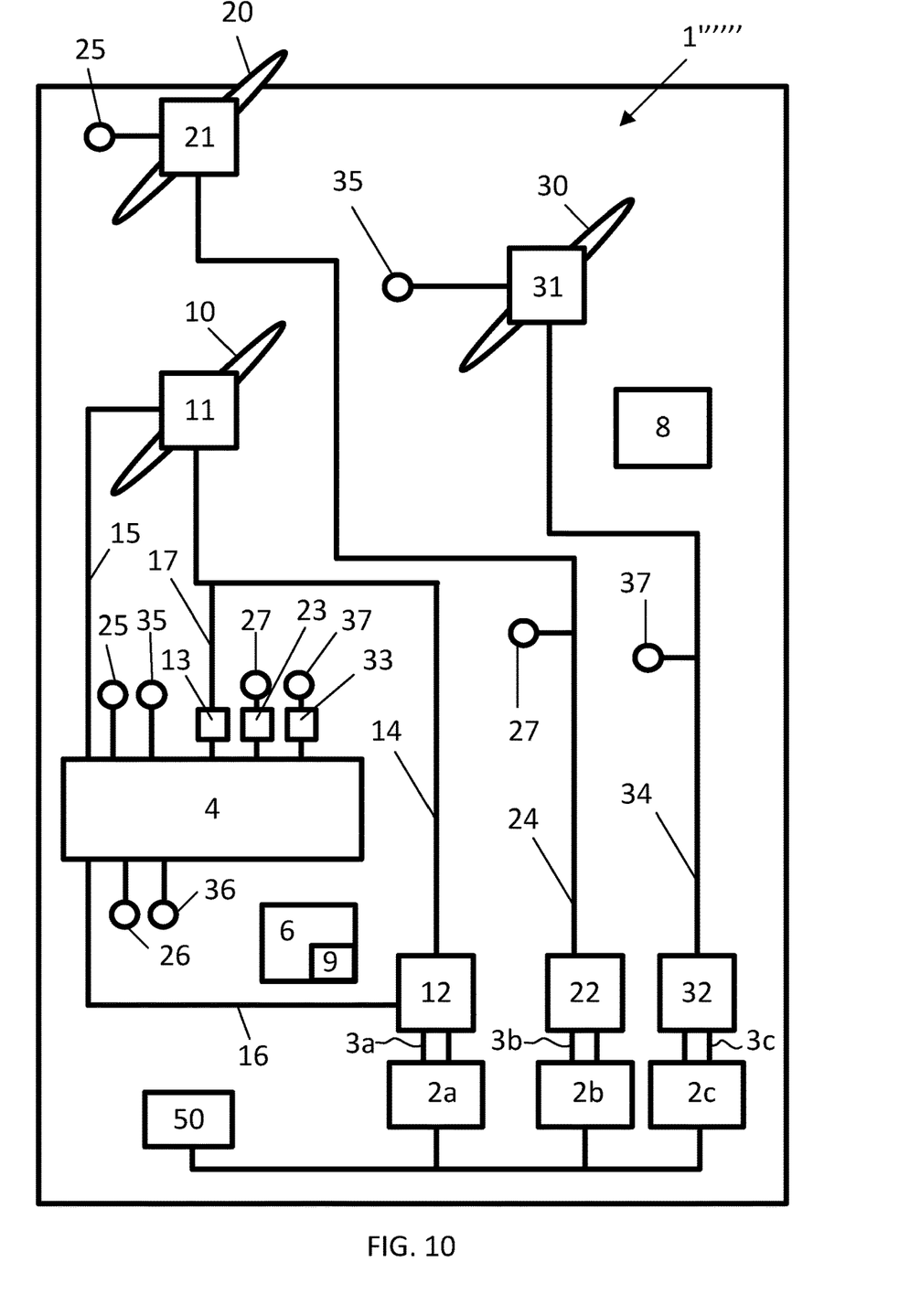
FIG. 10 discloses an embodiment of a multi-rotor aerial vehicle according to the invention where each hydraulic pump is provided with a power unit.

It is also possible as described in FIG. 10 of the multi-rotor aerial vehicle 1''''', to have a dedicated power unit 2 for each hydraulic pump 12, 22, 32. As with the previous embodiments each hydraulic pump 12, 22, 32, receives the same rotational input. The rotational input is controlled by the control unit that sees to that each power unit 2a, 2b, 2c are synchronized with the other power units 2a, 2b, 2c. The fuel tank 50 is disclosed as common for the power units 2a, 2b, 2c. Number of rotors can be chosen at any number with as with previous described embodiments comparable numbers of hydraulic motors, valves etc. Each hydraulic pump 12, 22, 32 is powered by a separate shaft 3a, 3b, 3c, from each dedicated power unit 2a, 2b, 2c.

The power unit 2 is preferably for all embodiments a gas turbine. The advantage of using a gas turbine is that they are very reliable. Another advantage is that it is possible to use a multitude of fuels. A gas turbine has a very high power to weight ratio, low vibrations low weight and the ability to run of heavy fuel.

In order to solve the problem intended to be solved of the present invention it should be understood that for embodiments using an electric fuel supply there is need to provide an energy source for electricity that has a high capacity weight ratio. One way can be through the use of a fuel cell, or a battery with increase capacity compared to present batteries. Or it could be provided more capacity through areal recharging from a second multi-rotor aerial vehicle, preferably a multi-rotor aerial vehicle.

For all embodiments above it should be understood that multi-rotor aerial vehicle could be both a so called Unmanned Aerial Vehicle, UAV or a manned areal vehicle. If the multi-rotor aerial vehicle is arranged to be able to carry a pilot of course it must be provided with controls for operation of the multi-rotor aerial vehicle. It should also be understood that the multi-rotor aerial vehicle could be controlled by a pilot not being present on board the multi-rotor aerial vehicle still the multi-rotor aerial vehicle being manned with passengers, technicians, rescue personnel etc.

For all embodiments it should be understood that the concept is not limited to three or four rotor multi-rotor aerial vehicles, it is thinkable to use any number of rotors depending on the application, such as five, six, seven eight etc. This is thus valid for all embodiments described including the ones of FIGS. 1, 2, 3, 5, 6, 7, 8, 9, 10.

For all embodiment including FIGS. 1, 2, 3, 5, 6, 7, 8, 9, 10, the definition that the hydraulic pumps receive the same rotational input is dependent of that the hydraulic pumps are configured alike. For example if different sizes of hydraulic pumps are used for different rotors, the rotational input must be adapted such that the flows of hydraulic fluid as output from respective hydraulic pump are the same. But of course, if different sizes of rotors are used, together with different sizes of hydraulic pumps, the whole system must be adapted such that each rotor can provide the same lift force as all other rotors. We submit that this lie within the common knowledge of the skilled person.

What is claimed is:

1. Multi-rotor aerial vehicle comprising,
   at least a first, second and third rotor, each rotatable by a dedicated first second and third hydraulic motor,
   at least one power unit,
   at least a first, second and third hydraulic pump dedicated to the respective first, second and third hydraulic motor, wherein each hydraulic pump is arranged to provide pressurized fluid to each hydraulic motor for powering the hydraulic motor and thereby rotating the respective rotor,
   a control unit for controlling the operation of the multi-rotor aerial vehicle, wherein the control of the multi-rotor aerial vehicle is configured to altering the flow of pressurized fluid distributed to each respective hydraulic motor,
   wherein the hydraulic pumps are arranged on a single output shaft of the power unit and the flow of pressurized fluid provided to each hydraulic motor is individually controllable by means of at least one control valve configured to control the flow of pressurized fluid from each hydraulic pump to its dedicated hydraulic motor.

2. The multi-rotor aerial vehicle according to claim 1, wherein further comprised is a transmitter/receiver unit for receiving remote control commands of the multi-rotor aerial vehicle.

3. The multi-rotor aerial vehicle according to claim 1, wherein the at least one power unit is a gas turbine.

4. The multi-rotor aerial vehicle according to claim 1, wherein further is provided with at least one gyro unit associated with the control unit, wherein the control unit by the input received from the at least one gyro unit is configured to control the multi-rotor aerial vehicle.

5. The multi-rotor aerial vehicle according to claim 1, wherein each hydraulic pump has a feed line to each dedicated hydraulic motor, and that through control of the dedicated control valve on each feed line, the fluid flow to each hydraulic motor is controlled, wherein the control valve is associated with the control unit, each control valve being arranged to bleed off fluid flow from respective feed line.

6. The multi-rotor aerial vehicle according to claim 1, wherein each hydraulic motor and each rotor are positioned on respective arms.

7. The multi-rotor aerial vehicle according to claim 1, wherein the rotational direction of the respective rotor is configured to achieve a zero rotational movement of the multi-rotor aerial vehicle.

8. The multi-rotor aerial vehicle according to claim 1 further comprising a self-sealable fuel tank.

9. The multi-rotor aerial vehicle according to claim 1 further comprising fixed wings for adding lift when the multi-rotor aerial vehicle is moving forward in a fluid medium.

10. The multi-rotor aerial vehicle according to claim 1, wherein all of said at least three hydraulic pumps receive the same rotational input.

11. The multi-rotor aerial vehicle according to claim 1, wherein the multi-rotor aerial vehicle has at least five rotors.

12. The multi-rotor aerial vehicle according to claim 1 further comprising one dedicated power unit for each hydraulic pump, wherein the dedicated power units are synchronized by the control unit such that each hydraulic pump receives the same rotational input.

13. The multi-rotor aerial vehicle according to claim 1, wherein the rotors have fixed pitch.

14. The multi-rotor aerial vehicle according to claim 1, wherein the rotors have a pitch that is adjustable manually when the multi-rotor aerial vehicle is not in operation.

15. The multi-rotor aerial vehicle according to claim 1, wherein the rotors have a pitch that is adjustable in flight.

16. The multi-rotor vehicle according to claim 1, wherein the at least one power unit uses a combustible fuel.

17. The multi-rotor aerial vehicle according to claim 16, wherein the fuel is provided to the power unit from a fuel supply that is comprised on the multi-rotor aerial vehicle.

18. The multi-rotor aerial vehicle according to claim 16, wherein the fuel used by the power unit is supplied from an external fuel supply.

19. The multi-rotor aerial vehicle according to claim 18, wherein the external supply is situated on the ground, and the fuel is supplied through a fuel line through pumping from the ground up.

20. The multi-rotor aerial vehicle according to claim 1, wherein the multi-rotor aerial vehicle has four rotors.

21. The multi-rotor aerial vehicle according to claim 20, wherein the rotors are associated in pairs such that two or four of the rotors have the same size and configuration.

22. The multi-rotor aerial vehicle according to claim 1, wherein a rotational axis of the respective rotor and hydraulic motor is coaxial.

23. The multi-rotor aerial vehicle according to claim 22, wherein at least one of the rotors is tiltable.

24. The multi-rotor aerial vehicle according to claim 1, wherein the power unit transfers the power to the respective hydraulic pump through a gear.

25. The multi-rotor aerial vehicle according to claim 24, wherein each hydraulic pump receives the same rotational input.

* * * * *